(12) United States Patent
Torigoe et al.

(10) Patent No.: US 7,450,281 B2
(45) Date of Patent: Nov. 11, 2008

(54) IMAGE PROCESSING APPARATUS AND INFORMATION PROCESSING APPARATUS, AND METHOD THEREOF

(75) Inventors: Makoto Torigoe, Tokyo (JP); Takeshi Makita, Shizuoka (JP); Yuji Akiyama, Kanagawa (JP); Osamu Yamada, Tokyo (JP); Takuya Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1074 days.

(21) Appl. No.: 10/420,730

(22) Filed: Apr. 23, 2003

(65) Prior Publication Data

US 2003/0202194 A1 Oct. 30, 2003

(30) Foreign Application Priority Data

Apr. 30, 2002 (JP) ............................. 2002-129333
May 2, 2002 (JP) ............................. 2002-130555

(51) Int. Cl.
G03F 3/00 (2006.01)
H04N 1/54 (2006.01)
H04N 1/56 (2006.01)
H04N 1/60 (2006.01)

(52) U.S. Cl. ..................... 358/523; 358/500; 358/518; 358/519; 358/525; 358/1.16; 345/594; 345/601; 345/602; 345/603; 345/604; 345/606

(58) Field of Classification Search ................. 358/500, 358/518, 519, 523, 525, 1.16; 345/594, 601–604, 345/606
See application file for complete search history.

(56) References Cited

U.S. PATENT DOCUMENTS

| | | | | |
|---|---|---|---|---|
| 5,258,747 A | * | 11/1993 | Oda et al. ..................... 345/602 |
| 5,483,360 A | * | 1/1996 | Rolleston et al. ............. 358/518 |
| 5,604,610 A | * | 2/1997 | Spaulding et al. ............ 358/525 |
| 6,504,571 B1 | * | 1/2003 | Narayanaswami et al. ........................ 348/231.99 |
| 7,015,493 B2 | * | 3/2006 | Petrucci et al. .............. 250/581 |
| 7,046,393 B2 | * | 5/2006 | Zeng ............................ 358/1.9 |
| 7,082,227 B1 | * | 7/2006 | Baum et al. .................. 382/311 |
| 2003/0048464 A1 | | 3/2003 | Yamada et al. ................ 358/1.9 |
| 2005/0122405 A1 | * | 6/2005 | Voss et al. ................. 348/211.2 |
| 2006/0209323 A1 | * | 9/2006 | Sawada ....................... 358/1.9 |
| 2007/0168370 A1 | * | 7/2007 | Hardy ......................... 707/101 |

FOREIGN PATENT DOCUMENTS

| | | | |
|---|---|---|---|
| JP | 05-211655 | * | 8/1993 |
| JP | 08-16784 A1 | | 1/1996 |
| JP | 09-027916 | | 1/1997 |
| JP | 10-215377 | * | 8/1998 |
| JP | 2001-36762 A1 | | 2/2001 |
| JP | 2001-218075 A1 | | 8/2001 |
| JP | 2001-251529 | | 9/2001 |
| JP | 2001-352459 A1 | | 12/2001 |

* cited by examiner

*Primary Examiner*—David K Moore
*Assistant Examiner*—Beniyam Menberu
(74) *Attorney, Agent, or Firm*—Fitzpatrick, Cella, Harper & Scinto

(57) ABSTRACT

An image processing apparatus and information processing apparatus and method employs an output profile read-out unit that, according to a region designated by a preference selection unit, reads out one or more regional profiles from output profiles prepared for each such region. An output profile composing unit then combines the one or more output profiles based on a composition ratio input from the preference selection unit. The output profile is then input to a color matching processor for color matching.

5 Claims, 18 Drawing Sheets

# IMAGE PROCESSING APPARATUS AND INFORMATION PROCESSING APPARATUS, AND METHOD THEREOF

FIELD OF THE INVENTION

The present invention relates to an image processing apparatus and information processing apparatus, and a method therefor, for example a color conversion process in view of regional preferences.

BACKGROUND OF THE INVENTION

It has long been said that favorite colors vary by geographic region. For example, a comparison of skin color between Japan and North America reveals that flesh colors with a strong magenta coloration are favored in Japan. Color preferences by region are said to be due mainly to differences in people and in the amount of sunshine, although cultural differences count heavily as well. These preferences are also reflected in the color reproduction of film by manufacturers of silver halide sensitive materials. Thus, for example, Fuji's color film tends to have somewhat stronger magenta-colored flesh colors as compared to Kodak's color film.

Color printers have a variety of color conversion and processing functions in order to provide users with desired color reproduction.

However, fine color conversion/processing function settings have a very wide degree of freedom, such that, when used mistakenly, not only is the desired image not obtained but very often even an acceptable result is hard to acquire. Much knowledge and experience is necessary in order to obtaining desired image.

Accordingly, the present invention has been conceived in light of the foregoing considerations, and has as its object to provide color conversion that takes regional and user preferences into consideration.

SUMMARY OF THE INVENTION

According to the present invention, the foregoing object is attained by providing an information input apparatus comprising an input unit adapted to input regional information into a color conversion apparatus for executing color conversion of an image based on regional information, wherein as the regional information, information indicating a plurality of regions and information indicating a degree of influence that the information indicating these regions give the color conversion can be input by the input unit.

According to the present invention, the foregoing object is attained by providing an image processing apparatus comprising:

an input unit adapted to input regional information by user; and a conversion unit adapted to color-convert an image based on the regional information, wherein as the regional information, information indicating a plurality of regions and information indicating a degree of influence that the information indicating these regions give the color conversion can be input by the input unit.

According to the present invention, the foregoing object is attained by providing an information input method for inputting regional information into a color conversion apparatus for color conversion of an image based on regional information, wherein as input the regional information, information indicating a plurality of regions and information indicating a degree of influence that the information indicating these regions give the color conversion can be input.

According to the present invention, the foregoing object is attained by providing an image processing method for color conversion of an image based on input regional information by user, wherein as the input regional information, information indicating a plurality of regions and information indicating a degree of influence that the information indicating these regions give the color conversion can be input by the input unit.

According to the present invention, the foregoing object is attained by providing an image processing apparatus comprising:

an intermediate data conversion unit adapted to convert input RGB data into a first intermediate data;

a retention unit adapted to retain a color conversion table corresponding to a plurality of types of color reproduction;

a selection unit adapted to select a desired color reproduction;

a color conversion unit adapted to execute color convert processing of the first intermediate data to generate a second intermediate data using a color conversion table corresponding to a desired color reproduction of the color conversion table corresponding to a plurality of types of color reproduction retained by the retaining unit; and an output unit adapted to generate output data based on the second intermediate data and to output the output data.

According to the present invention, the foregoing object is attained by providing an image processing method comprising:

an intermediate data conversion step of retaining a color conversion table corresponding to a plurality of types of color reproduction in a memory;

converting input RGB data into a first intermediate data;

a selection step of selecting a desired color reproduction;

a color conversion step of executing color convert processing of the first intermediate data to generate a second intermediate data using a color conversion table corresponding to a desired color reproduction of the color conversion table corresponding to a plurality of types of color reproduction retained in the memory; and an output step of generating output data based on the second intermediate data and outputting the output data.

Other objects, features, effects and advantages of the present invention will be apparent from the following description, taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention are described in detail in accordance with the accompanying drawings.

First Embodiment

Figure 1:
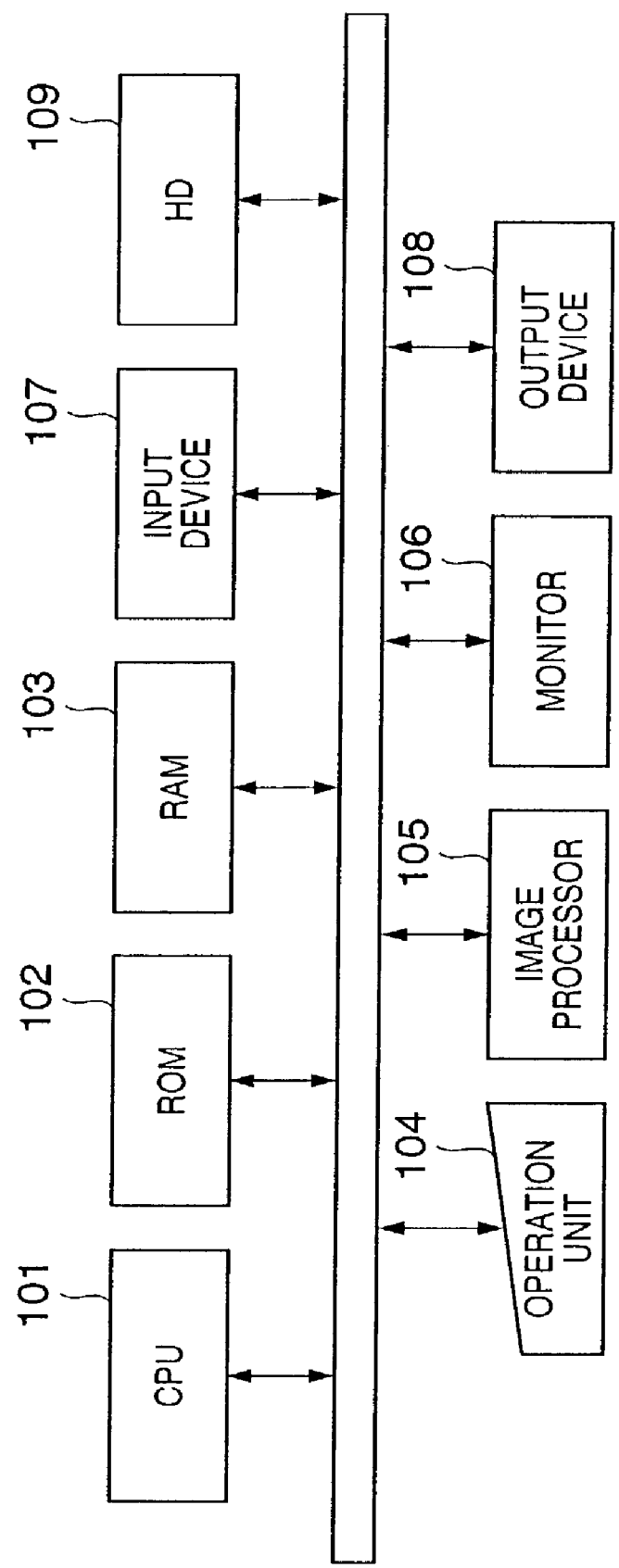
FIG. 1 is a block diagram of a sample structure of a host computer according to a first embodiment of the present invention.

FIG. 1 is a block diagram of a sample structure of a computer device (to be referred to as a host computer hereinafter) according to a first embodiment of the present invention.

As shown in the diagram, a CPU 101 controls a RAM 103, a operation unit 104, an image processor 105, a monitor 106, an input device 107 and an output device 108 according to data, control programs, operating system (OS) software, application programs (AP), color matching processing modules (CMM) and device drivers stored on a ROM 102 and hard disk (HD) 109 so as to perform a variety of controls and processes.

The RAM 103 has a work space for executing various control programs and has also a temporary storage space for storing data input from the operation unit 104.

The input device 107 may be an image input device, which may input obtained image data to the host computer, such as an image scanner, digital camera, still video camera or the like, equipped with CCD or CMOS sensors.

The output device 108 may be an inkjet printer, a thermal-transfer printer, a wire dot printer or the like, forming and outputting a color image onto recording paper.

The operation unit 104 may be a mouse, keyboard or the like, enabling a user to input settings for the operating conditions for the input device 107 and output device 108 as well as various conditions for image processing.

The image processor 105 may for example be a function expansion chip composed of ASIC or DSP hardware, and performs a variety of image processes including imaging (to be described later) in accordance with the CPU 101 controls. It should be noted that, if the CPU 101 is a high-performance one and if the RAM 103 and hard disk 109 access is sufficiently speedy, the effect of the present invention can still be achieved even without the use of any special function expansion card for the image processor 105, when a program corresponding to the image process to be described later is executed using CPU 101, RAM 103, and HD 109.

The monitor 106 may be a CRT, LCD or the like. The monitor 106 displays the image processing results as well as the user interface screen when the operation unit 104 is being used.

It should be noted that, though not shown in FIG. 1, the operation unit 104, monitor 106, input device 107, output device 108 and hard disk 109 are each connected to a host computer via particular interfaces.

<An Image Processor>

Next, a detailed description is given of the structure and operation of the image processor 105.

Figure 2:
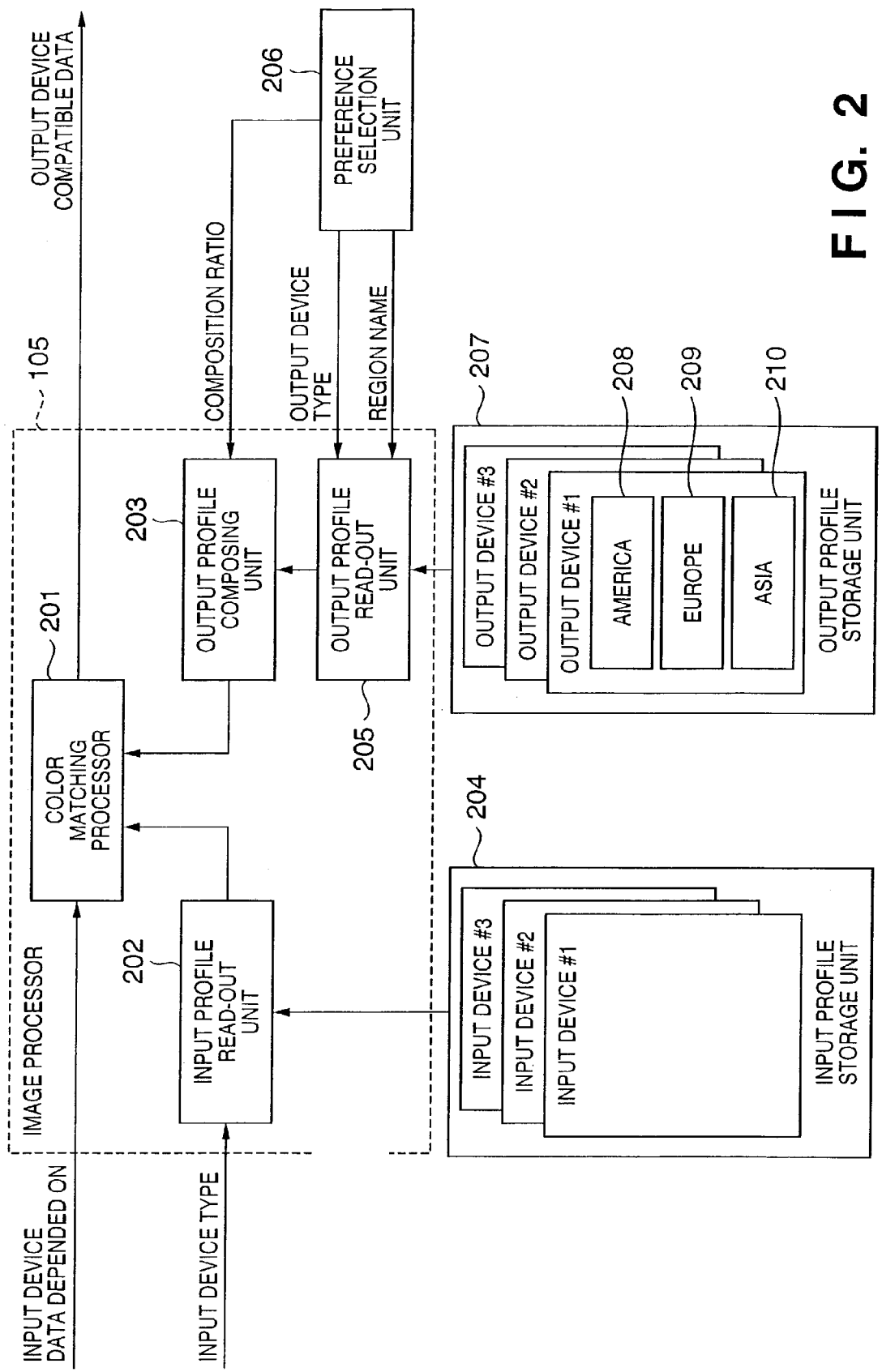
FIG. 2 is a diagram illustrating processing by an image processor executed based on a color matching processing module.

FIG. 2 is a diagram illustrating processing by an image processor 105 executed based on a color matching processing module.

A color matching processor 201 that performs color matching processing converts image data input via the OS and compatible with the input device 107 into image data compatible with the output device 108.

When "Input Device Type" information, indicating which of the multiple types of input devices 107 connected to the host computer is inputting image data, is input to an input profile read-out unit 202, the input profile read-out unit 202 reads out input profile data describing the input characteristics of the device that corresponds to the input information from an input profile storage unit 204.

It should be noted that the input profile storage unit 204 may be allocated to the hard disk 109, for example, so that a plurality of input profiles describing the input characteristics of the variety of input devices 107 connected to the host computer are pre-stored.

An output profile read-out unit 205 reads out a specific output profile from the output profile storage unit 207. Specifically, the output profile read-out unit 205 selects a profile for a device corresponding to the "Output Device Type" information indicating which of the multiple output devices 108 connected to the host computer is to output the image, the "Recording Media Type", "Halftoning Method", "Resolution" information set for that device, and the "Ink Type" information indicating the type of recording agent to be used for image output. Further, output profile read-out unit 205 reads out one or more output profiles from the each output profile prepared for each region (FIG. 2 shows an example in which an American profile 208, a European profile 209 and an Asian profile 210 have been pre-set), according to the "Region Name" designated by the preference selection unit 206.

It should be noted that typical color preferences per region are surveyed beforehand, output profiles for achieving those color preferences are prepared, and, for example, stored in an output profile storage unit 207 allocated to the hard disk 109. Of course, output characteristics corresponding to the various settings of the output devices 108 connected to the host computer as well as a plurality of output profiles describing the regional characteristics are pre-stored in the output profile storage unit 207.

An output profile composing unit 203 composes the one or more output profiles read out by the output profile read-out unit 205. The profile composition is performed based on the composition ratio input from the preference selection unit 206, inputting the composed output profile to the color matching processor 201.

Figure 3:
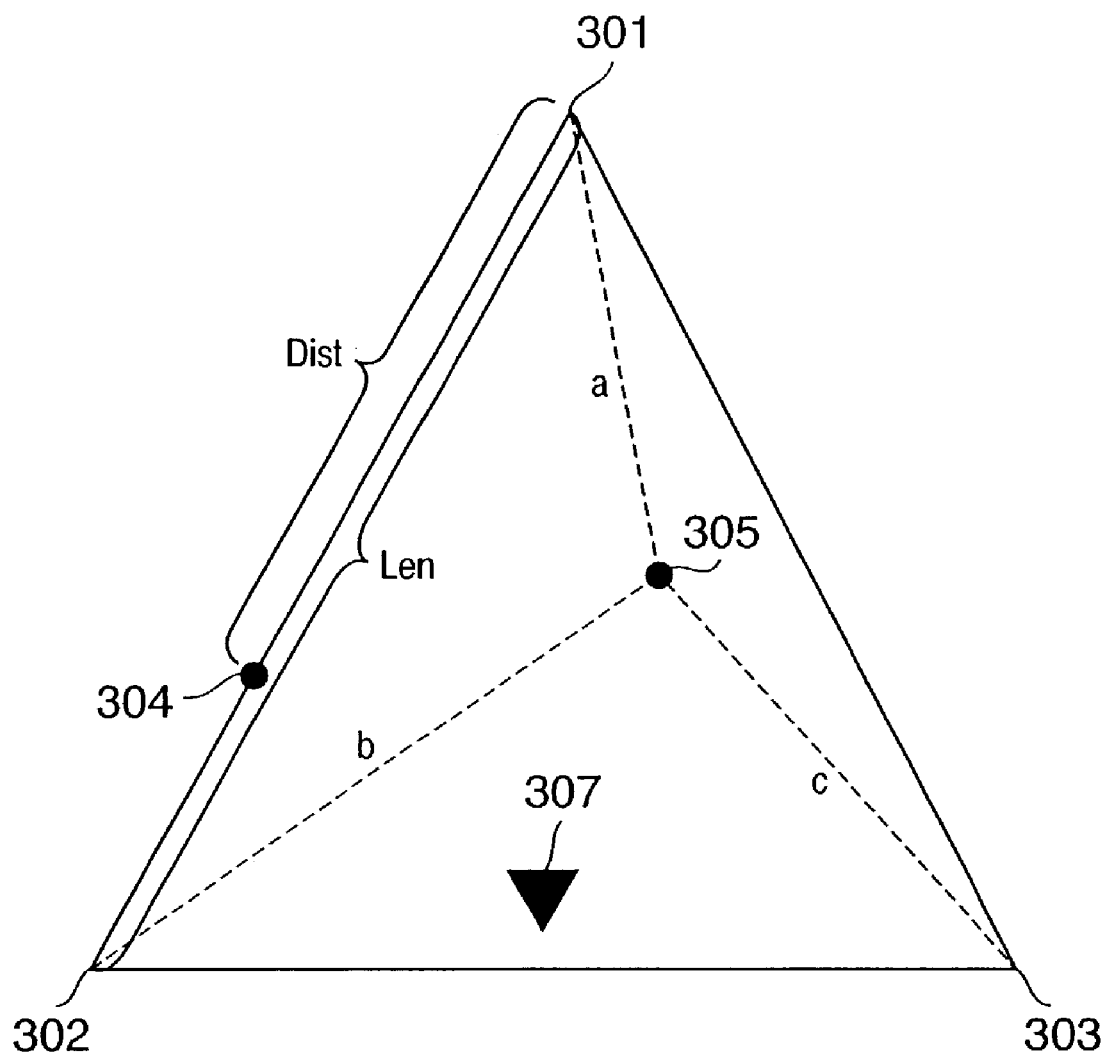
FIG. 3 shows a user interface for a preference selection unit.

FIG. 3 shows a user interface for a preference selection unit.

The preference selection unit 206 is achieved by processing performed by the CPU 101, with the user interface shown in FIG. 3 being displayed on the monitor 106. It should be noted that although FIG. 3 shows an example with three regions, the present invention is not limited to such a configuration.

Apex 301 of the triangle of the user interface shown in FIG. 3 corresponds a region A (for example Asia), apex 302 corresponds a region B (for example America) and apex 303 corresponds a region C (for example Europe). A cursor 307 that the user uses to set a preference moves through the interior of the triangle according to moving of a pointing device such as a mouse of the operation unit 104. If the cursor 307 is moved to apex 301 and, for example, the mouse button clicked, region A is designated. Similarly, if the cursor 307 is moved to apex 302 and the mouse button is clicked, region B is designated. Likewise for region C. In each of these three cases, the name of the region corresponding to the designated apex is sent to the output profile read-out unit 205. Therefore, in these cases, the output profiles corresponding to the designated region names are input into the color matching processor 201 without the profiles being composed.

At the same time, if the cursor 307 is moved to some point other than an apex and the mouse button is clicked, the following occurs.

* On a line between two apexes.

Names of two regions are input to the output profile read-out unit 205, with the composition ratio of the two profiles being input to the output profile composing unit 203. For example, if the point 304 shown in FIG. 3 is selected, the composition ratios rA and rB of the output profiles PA and PB corresponding to regions A and B are expressed by the following formula:

$$rA = 1 - \text{Dist}/\text{Len}$$

$$rB = \text{Dist}/\text{Len} \tag{1}$$

That is, when point 304 is designated, it is determined that the user designates an output profile between region A and region B, and closer to region B.

* A point inside the triangle other than a side.

Names of three regions are input to the output profile read-out unit 205, with the composition ratio of the three profiles being input to the output profile composing unit 203. For example, if point 305 shown in FIG. 3 is designated, the composition ratios rA, rB and rC of the output profiles PA, PB and PC corresponding to regions A, B and C are expressed by the following formula:

$$rA = 1 - 2a/(a+b+c)$$

$$rB = 1 - 2b/(a+b+c)$$

$$rC = 1 - 2c/(a+b+c) \tag{2}$$

Based on the output profiles that are input and the composition ratios, the output profile composing unit 203 composes an output profile according to the following formula:

$$\text{composite profile} = \Sigma pi \times ri$$

Here, the range of $\Sigma$ is i=from 1 to 2 or from 1 to 3.

When color level points are expressed in CIE L*a*b* color space, for example, the color level point L*a*b* (50, 10, 30) for output profile PA for region A, the color level point L*a*b* (52, 12, 32) for output profile PB for region B and the composition ratio rA=2/5 and rB=3/5, color level points of each composite profile are as follows:

$$L^* = 50 \times 2/5 + 52 \times 3/5 = 51.2$$

$$a^* = 10 \times 2/5 + 12 \times 3/5 = 11.2$$

$$b^* = 30 \times 2/5 + 32 \times 3/5 = 31.2$$

Although this conversion example shows only one point of the output profile, in actuality the composing is carried out for all the points in the grid of the output profile (normally, the number of points in the grid is 9×9×9=729) to produce a composite profile.

<A Sample Output Profile>

Figure 4:
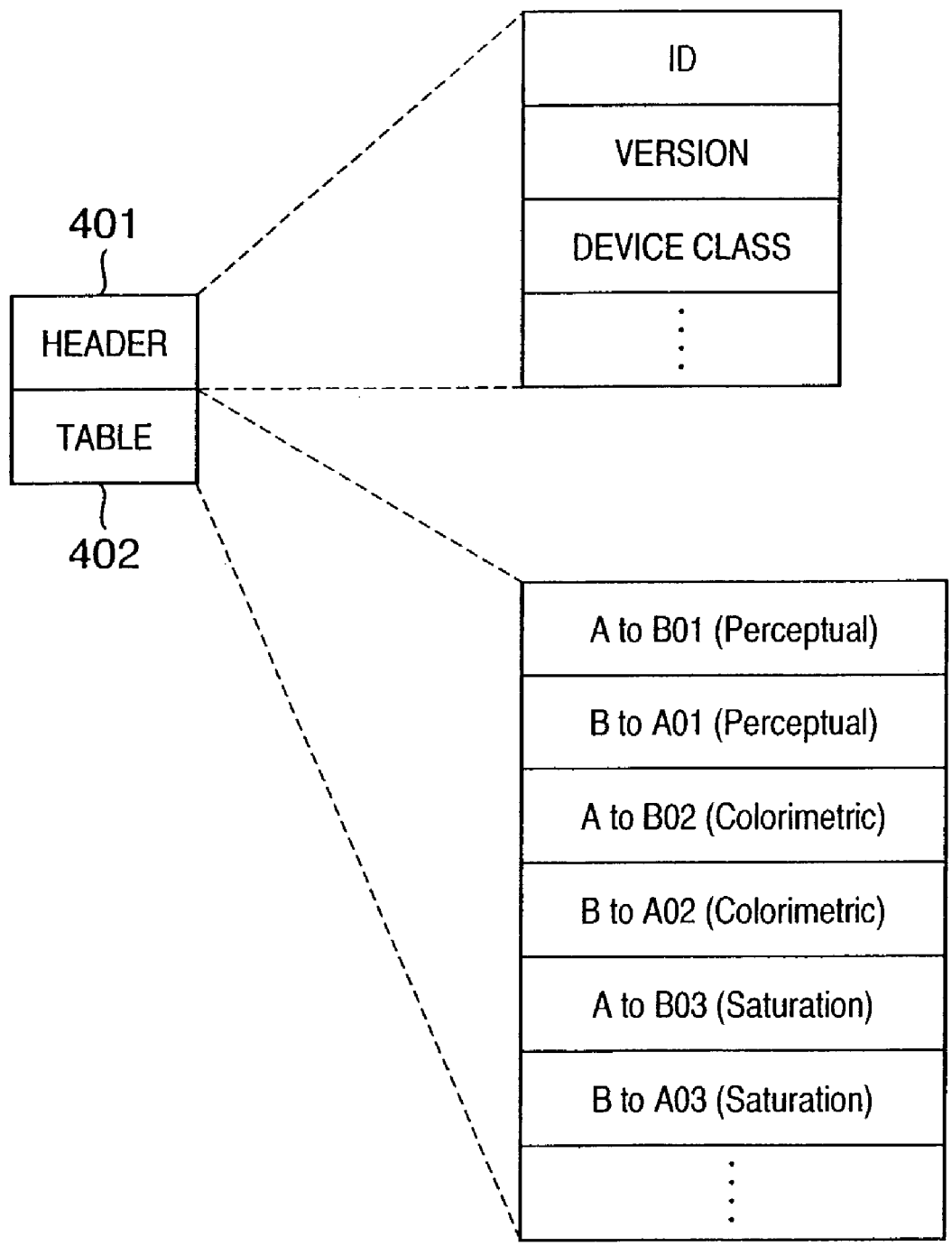
FIG. 4 shows a sample output profile.

FIG. 4 shows a sample output profile.

As shown in the diagram, the profile includes a header 401 that describes basic information relating to the various types of profiles and a table 402 that describes information used in color matching information. The header 401, for example, includes ID information, version information, device class information indicating the basic type of device, and the like.

In addition, the table 402 includes BtoA information, which is parameters pertain to the processing of converting an image data B in a PCS (Profile Connection Space) not depended on any particular device to an image data A in a color space depended on a given device, as well as AtoB data, which are color processing parameters pertain to processing of converting data A in a color space depend on a given device, to image data B in the PCS. BtoA and AtoB information corresponding to each of several color matching methods that a color matching module supports, that is, perceptual, calorimetric and saturation, is stored. The perceptual color matching method emphasizes gradations of color and is best suited for photographic images. The colorimetric color matching method aims at reproducing a colorimetrically exact color and is best suited for logo-type images. The saturation color matching method emphasizes the brightness or vivacity of a color and is best suited for graphs and computer graphics (CG) images.

In order to specifying each color matching method corresponding to color processing parameters shown in FIG. 4, it is assigned number "01" to the perceptual color matching method, "02" to the calorimetric color matching method and "03" to the saturation color matching method.

It should be noted that, as described above, the output profiles used in the present embodiment are obtained by taking account of regional characteristics or are obtained by taking account of composing output profiles corresponding to a plurality of regions using a composition ratio specified by the user.

<Color Matching Processing>

Figure 5:
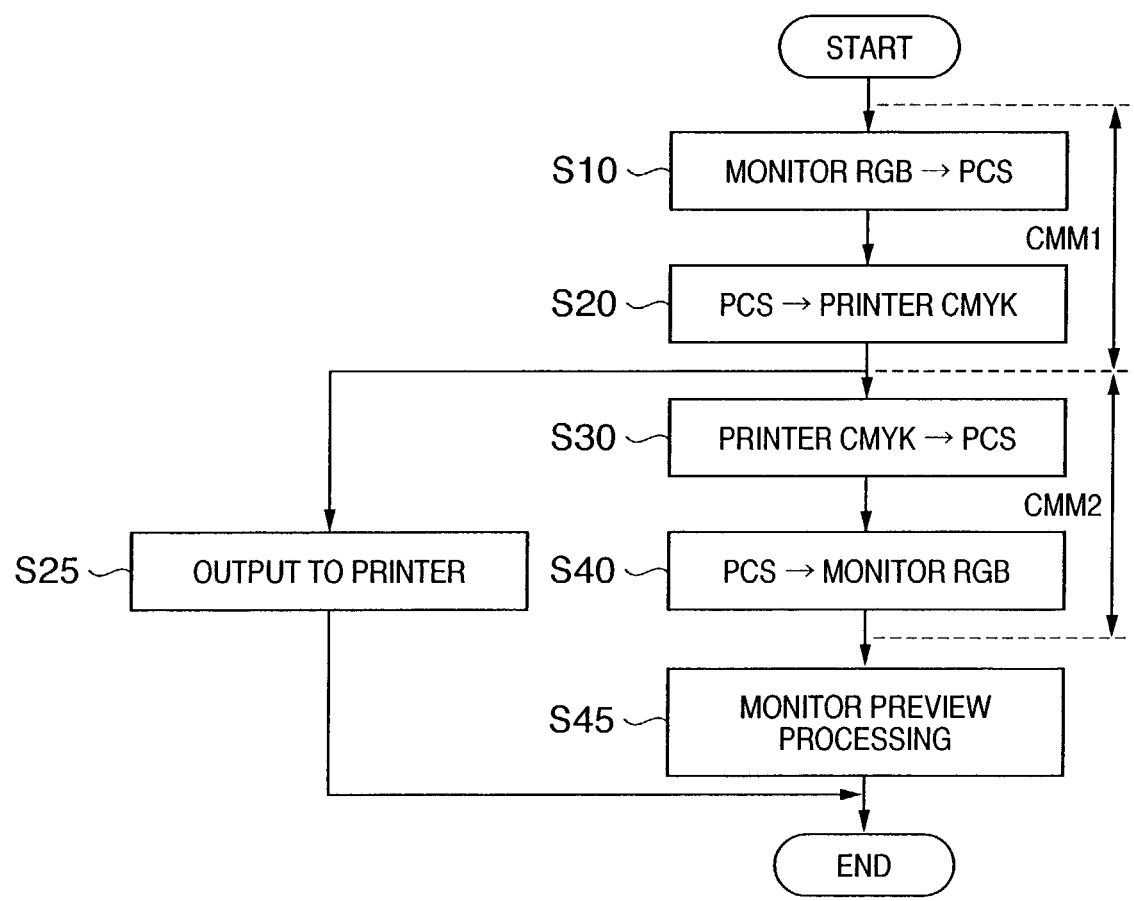
FIG. 5 is a flow chart illustrating color matching for image formation processing and preview processing using an output profile.
Figure 6:
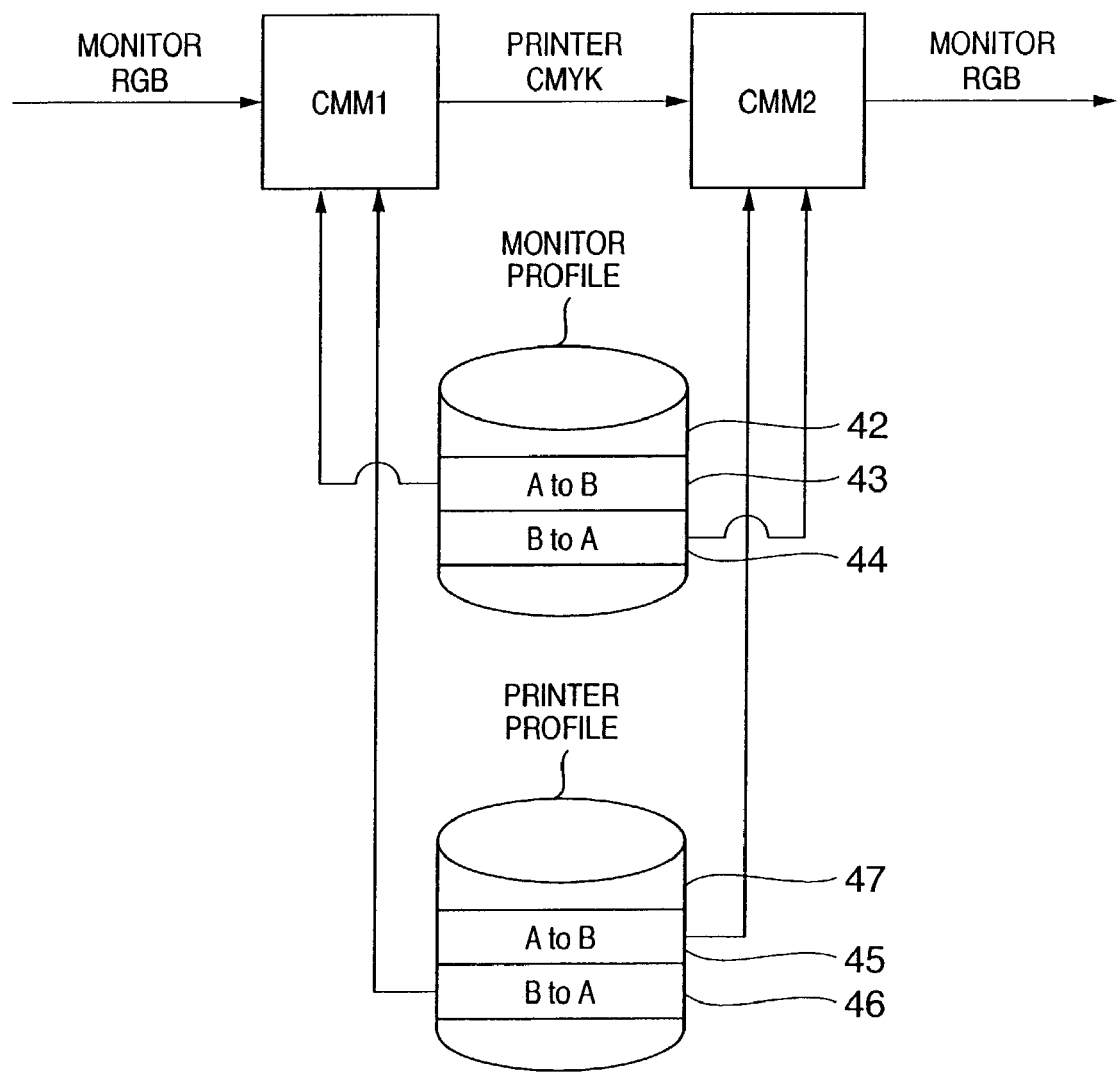
FIG. 6 is a diagram illustrating color matching for image formation processing and preview processing using an output profile.

A description is now given of the color matching process, with reference to FIGS. 5 and 6.

FIG. 5 is a flow chart illustrating color matching processing for image formation processing and preview processing using an output profile. FIG. 6 is a diagram illustrating color matching processing for image formation processing and preview processing using an output profile.

An input image created using, for example, a DTP application running on an OS is expressed as RGB data compatible with the monitor characteristic (hereinafter referred to as monitor RGB). A color matching module CMM1 converts an image expressed as monitor RGB to an image expressed as CMYK data (hereinafter printer CMYK) compatible with the output device characteristic (a printer, for example) via the PCS, corresponding to steps S10 and S20 in FIG. 5.

In this case, first, a monitor profile 42 is read out by the input profile read-out unit 202 and AtoB information 43 is set in the CMM1. A printer profile 47 is then read out by the output profile read-out unit 205 and BtoA information 46 corresponding to the specified color matching method is set in the CMM1.

Figure 7:
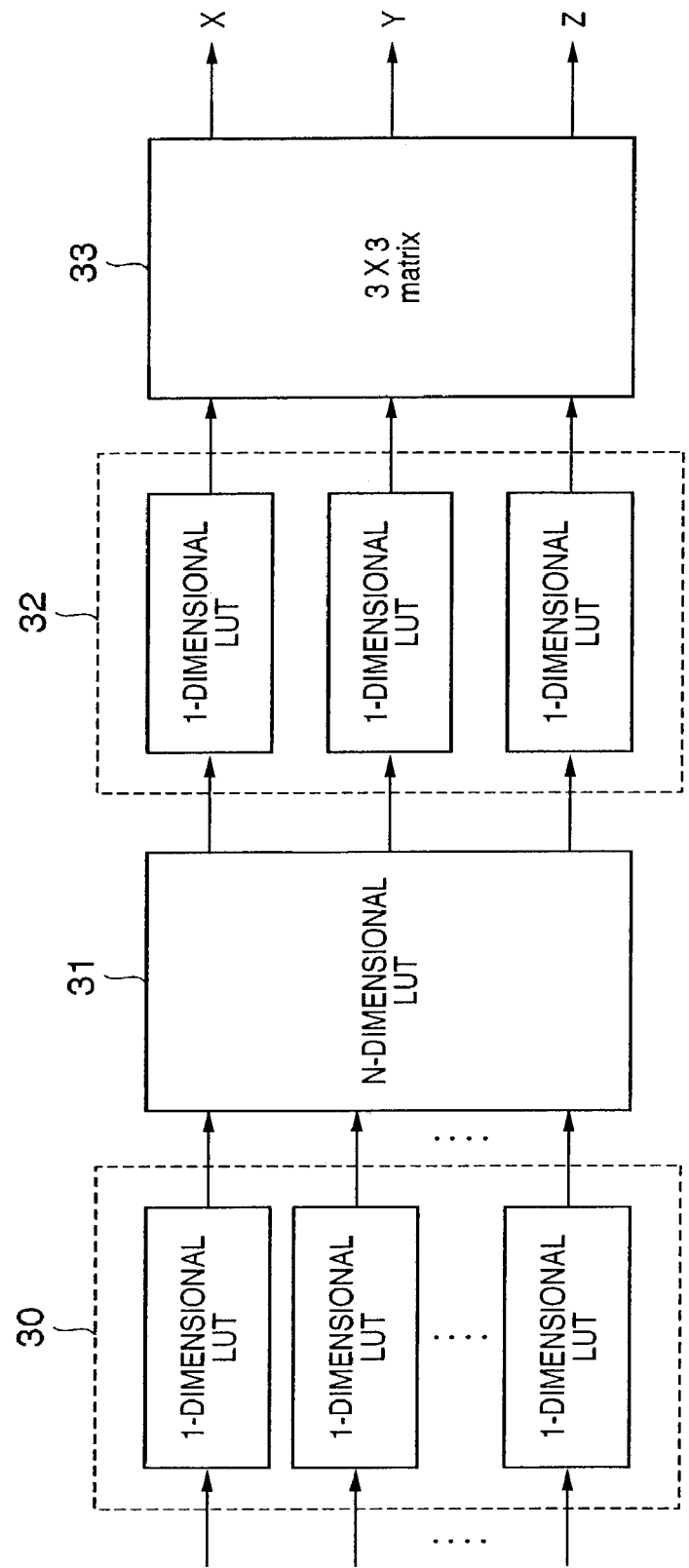
FIG. 7 is a diagram illustrating the structure of A to B information.
Figure 8:
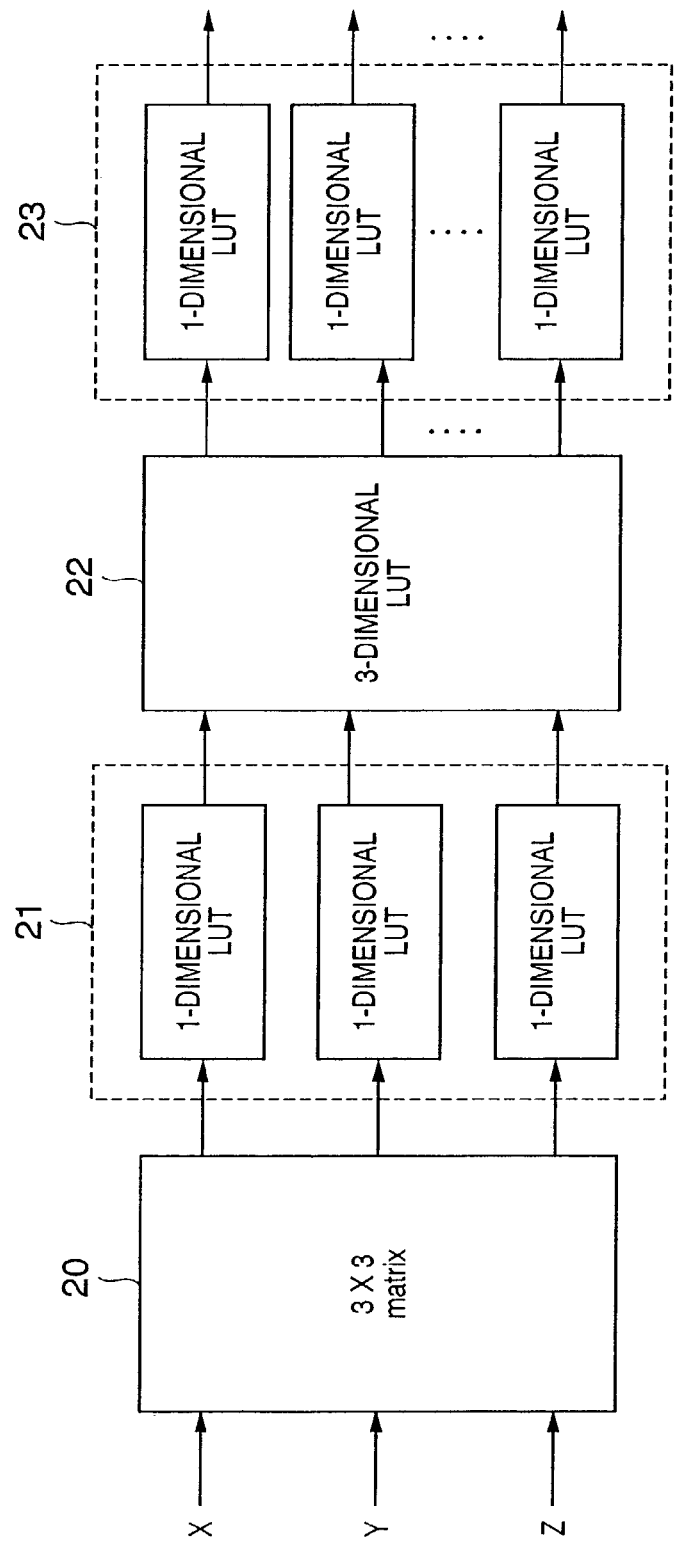
FIG. 8 is a diagram illustrating the structure of B to A information.

FIG. 7 is a diagram illustrating the structure of AtoB information. FIG. 8 is a diagram illustrating the structure of AtoB information.

The AtoB information 43, as shown in FIG. 7, contains three 1-dimensional LUT groups 32 for performing reverse gamma processing corresponding to the gamma characteristics of the monitor that is the input device and a 3×3 matrix 33 that converts RGB data defined by standard space to XYZ data. It should be noted that, in this case, processes using the N-dimensional LUT 31 and the M 1-dimensional LUT group 30 are skipped and not performed.

The BtoA information 46, as shown in FIG. 8, contains a 3×3 matrix 20 for converting image data defined by XYZ space into image data defined by L*a*b* space, a 1-dimensional LUT group 21, a 3-dimensional LUT 22 for performing the specified color matching processing to converting image data to data within the printer color reproduction range, and a 1-dimensional LUT group 23 for performing gamma correction according to the printer gradation characteristics.

In FIG. 5, in step S10, the monitor RGB is converted to XYZ data (PCS data) based on the AtoB information 43. In step S20, the XYZ data is converted to printer CMKY data based on the BtoA information 46.

When forming an image, in a step S25 shown in FIG. 5, the printer CMKY is output to the output device 108, and color matching processing and image processing end. By contrast, in the case of a preview processing, the process continues with the execution of steps S30 and S40, with the image data obtained as a result being output to the monitor 6 in a step S45.

In steps S30 and S40, a CMM2 converts CMYK data (printer CMYK) depend on characteristic of the output device 108 and generated by the CMM1 into RGB data depend on characteristic of the monitor 106 that displays the preview image.

In such case, first, a printer profile 47 is read out by the input profile read-out unit 202, and AtoB information 45 corresponding to the specified color matching method is set in the CMM2. A monitor profile 42 read out by the output profile read-out unit 205 and BtoA information 44 is set in the CMM2.

The AtoB information 45 has data for performing conversions according to the steps shown in FIG. 7, printer, and includes LUT group 30 for inverse processing of processing using 1-dimensional LUT group 23 (shown in FIG. 8) for gamma correction according to the printer gradation characteristics, N-dimensional LUT 31 for converting CMYK data processed by the 1-dimensional LUT group 30 based on the printer color reproduction characteristics to data defined by L*a*b* color space, 1-dimensional LUT group 32 for converting data defined by L*a*b* color space to XYZ color space data (PCS data), and a 3×3 matrix 33.

By contrast, BtoA data 44, as shown in FIG. 8, includes a 3×3 matrix 20 for reversing the conversion performed by the 3×3 matrix 33 shown in FIG. 7 and a 1-dimensional LUT group 23 for monitor gamma correction corresponding to the reversal of the conversion using the 1-dimensional LUT group 30.

In step S30, based on AtoB data 45, the printer CMYK is converted to XYZ data (PCS data). In step S40, based on BtoA data 44, the PCS data is converted to RGB data. In step S45, the monitor RGB image data is output to the monitor 6, completing the preview process.

It should be noted that, as described above, since the present embodiment uses an output profile obtained by composing output profiles, which are to be taking account of regional characteristic or are corresponding to a plurality of regions according to a composition ratio specified by the user, a result of color matching processing is that one or more regional characteristics is composed according to a composition ratio, and an image having a coloration corresponding to user preferences and the observation environment (that is, the region, whether indoors or outdoors, at home or at the office, the lighting, etc.) can be obtained.

<Variations>

In the above-described embodiment, preparing output profiles which each of these are optimized for each of output mediums having different color reproduction range each other, it can be made obtained an information of the output medium using a predetermined method (for example, it makes user specify) and selected an output profile or profiles from the regional information and the information of the output medium. By so doing, appropriate color matching reflecting regional information can be achieved for output mediums having different color reproduction ranges each other.

Also, it can be made that output profile is that makes the colors of the output image be the same for all differences in color reproduction range due to the use of different output medium, so that the output profile is selected from the regional information and color matching processing is carried out using the selected output profile. In that case, color matching, which reflects the regional information and makes the color of the output image the same for output mediums having different color reproduction ranges each other, can be achieved.

Second Embodiment

A description is given of a second embodiment of the present invention, with reference to FIGS. 9 through 18.

Figure 9:
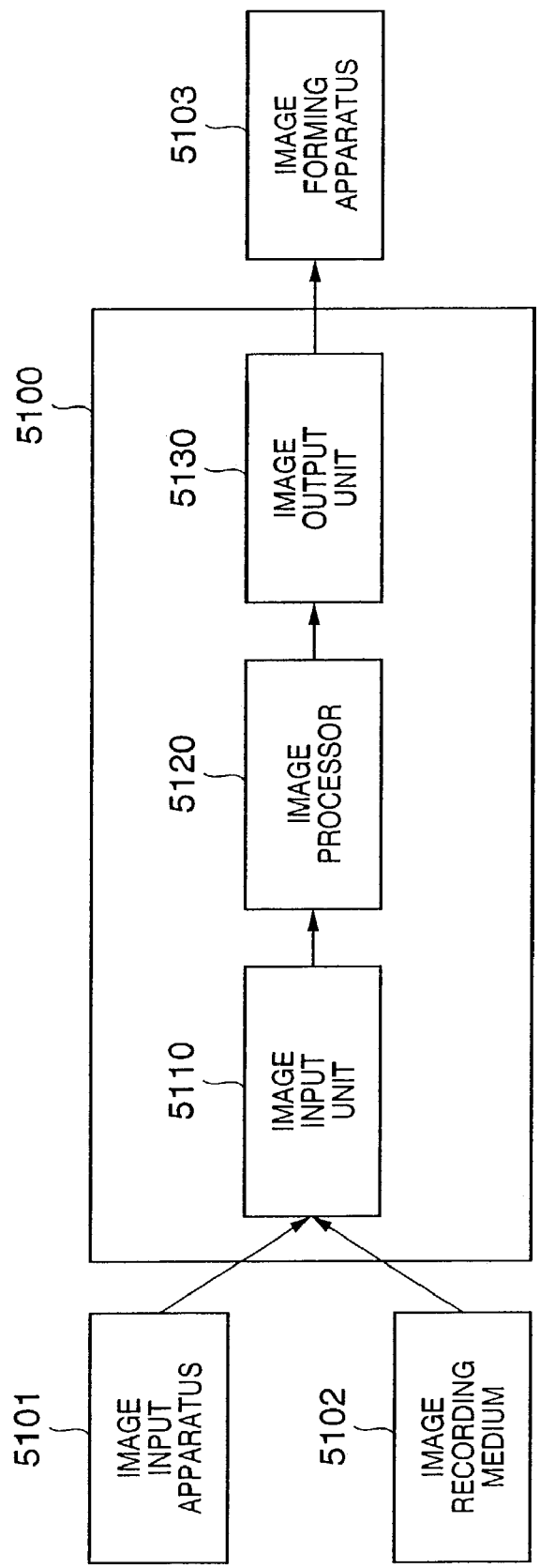
FIG. 9 is a block diagram showing the basic structure of an image processing apparatus according to a second embodiment of the present invention, relationship between the image processing apparatus and peripheral device.

FIG. 9 is a block diagram showing the basic structure of an image processing apparatus according to a second embodiment of the present invention, relationship between the image processing apparatus and peripheral devices.

As shown in FIG. 9, reference numeral 5100 denotes an image processing apparatus of the present embodiment. The image processing apparatus 5100 may be a personal computer, workstation or the like, and, as explained later, contains several components. Reference numeral 5110 denotes an image input unit for inputting image data from an image input apparatus 5101 (to be described later) and an image recording medium 5102 (to be described later) into an image processor 5120 (to be described later). Reference numeral 5120 denotes an image processor unit for executing an image processing to be described later. Reference numeral 5130 denotes an image output unit for outputting an image, which is processed by the image processor 5120, to an image forming apparatus 5103 (to be described later)

Reference numeral 5101 denotes an image input apparatus, which may be a digital camera, a scanner, or the like, and supplies images to the image processing apparatus 5100 as electronic data. The image recording medium 5102 described above may be a CD-ROM, a DVD-ROM or the like, and records images as electronic data. Like the image input apparatus 5101, the image recording medium 5102 supplies images to the image processing apparatus 5100 as electronic data. The image forming apparatus 5103 functions as a printer, printing an image onto a recording medium such as paper based on image data output from the image output unit 5130. More specifically, the image forming apparatus 5103 is typically a color printer that forms an image on paper using ink or toner of the colors cyan (C), magenta (M), yellow (Y) and black (K).

Figure 18:
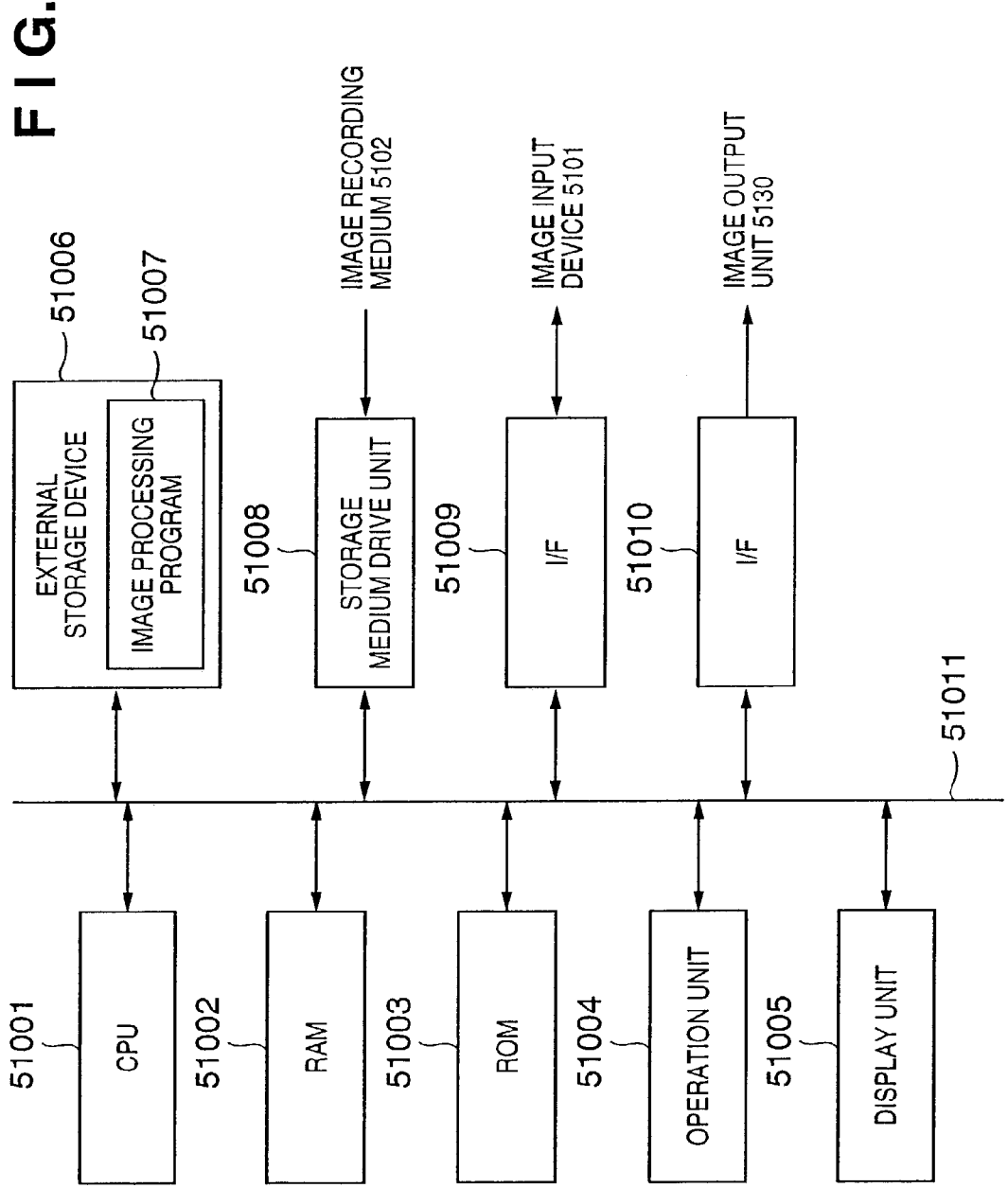
FIG. 18 is a block diagram showing the basic structure of the image processing apparatus of the second embodiment of the present invention.

FIG. 18 is a block diagram showing the basic structure of the image processing apparatus 5100 of the second embodiment of the present invention. As shown in the diagram, reference numeral 51001 denotes a CPU. The CPU 51001 uses programs and data recorded and stored in a RAM 51002 and ROM 51003 to exercise overall control of the apparatus and to communicate with the image forming apparatus 5103, as well as to carry out image processing including color conversion processing as described later. The RAM 51002 provides both an area for the temporary storage of data and programs loaded from an external storage device 51006 or storage medium drive unit 51008 as well as a work area used when the CPU 51001 performs various processes. The ROM 51003 stores programs and data for exerting overall control of the apparatus.

Reference numeral 51004 denotes a operation unit, which may be a pointing device such as a keyboard, mouse or the like, and by which the user can input into the apparatus a variety of instructions. Reference numeral 51005 denotes a display unit, which may be a CRT, LCD or the like, can display images, characters and the like. Reference numeral 51006 denotes an external storage device such as a hard disk drive or an external device connected via a communications line. The external storage device 51006 stores OS (not shown in the diagram) and the above-described image processor 5120 in order to exercise overall control of the apparatus, and an image processing program 51007, which functions as the image processor 5120, as file. The image processing program 51007 is read into the RAM 51002 as necessary and executed by the CPU 51001.

Reference numeral 51008 denotes a storage medium drive unit. The storage medium drive unit 51008 functions as the image input unit 5101 described above, reading out image data recorded on the image recording medium 5102 described above and outputting the image data to the RAM 51002 or the external storage device 51006. Reference numeral 51009 is an interface (I/F), which functions as the image input unit 5110 described above, outputting image input from the image input apparatus 5101 to the RAM 51002 or the external storage device 51006. Reference numeral 51010 denotes an interface (I/F), which functions as the image output unit 5130 described above, outputting image data as result of color conversion to the image forming apparatus 5103. Reference numeral 51011 denotes a bus that connects all the above-described components.

Figure 10:
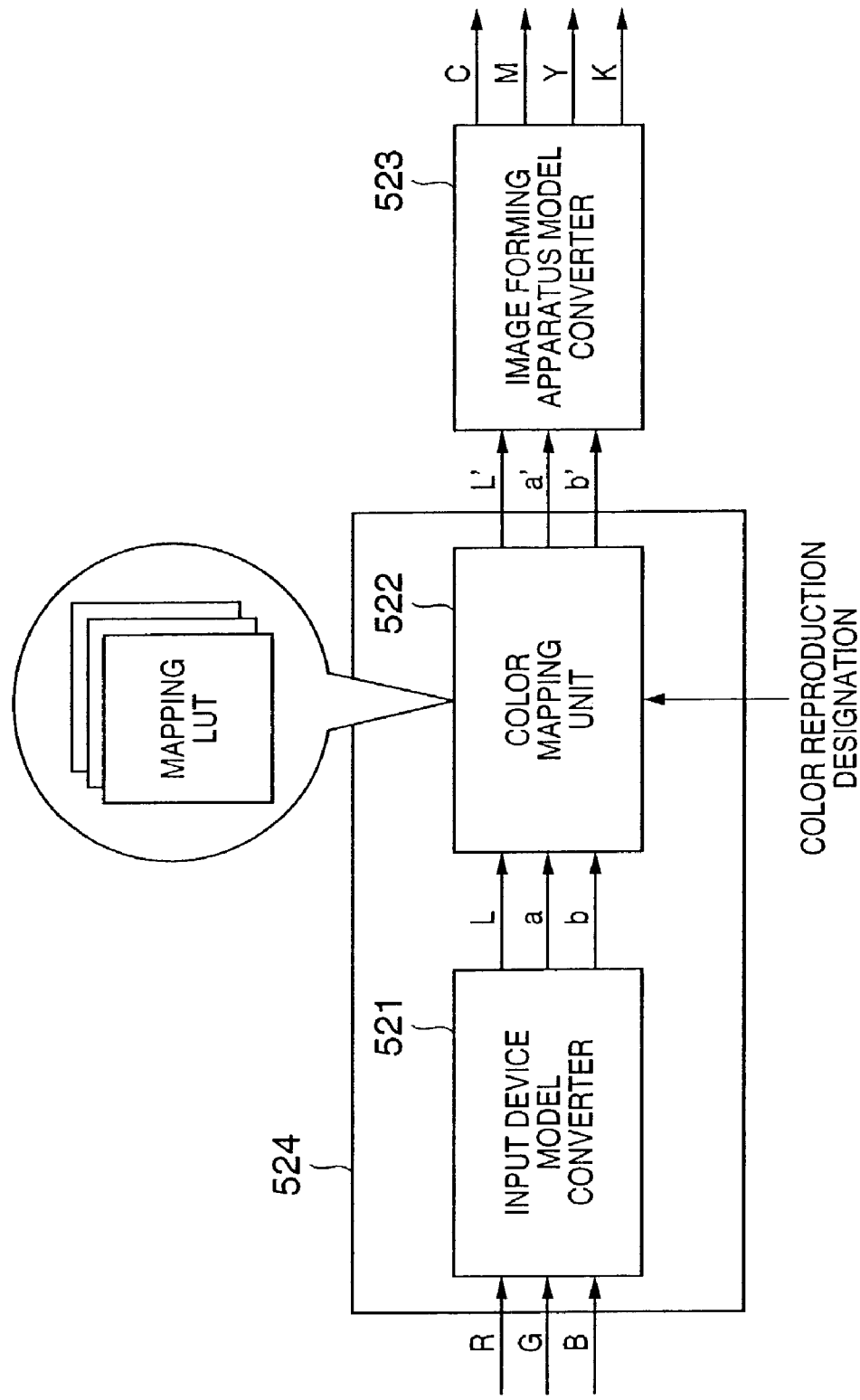
FIG. 10 is a block diagram showing the functional structure of the image processing apparatus according to the second embodiment of the present invention.

FIG. 10 is a block diagram showing the functional structure of the image processor 5120 according to the second embodiment of the present invention. The image data is composed of an RGB color signal. This RGB color signal is converted to color signals of components L, a, b by an input device model converter 521, and each color signal then is converted to the signals L', a', b' (each color signal can be reproduced by the image forming apparatus 5103) respectively according to the various color reproductions to be described later by a color mapping unit 522. Then, the individual signals L', a', b' are converted by an image forming apparatus model converter 523 to CMYK color signals compatible with the image forming apparatus 5103. The input apparatus model converter 521 typically converts the RGB color signal into color signal Lab on an equivalent color space CIELAB corresponding to color perception, using a conversion formula that is based on sRGB specifications (IEC61966). The image forming apparatus model converter 523 typically converts the CIELAB color space color signal L'a'b' to an output color signal CMYK compatible with the image forming apparatus 5103 using a commonly-known color separation Look Up Table (LUT).

The color separation LUT obtains a CMYK color signal corresponding to the appropriate discrete L'a'b' input color signal (CIELAB value) from the CMYK color signal and the measured color value (CIELAB value) of the print outputted this color signal at the image forming apparatus 5103. An output color signal CMYK corresponding to any given color signal L'a'b' is obtained by a commonly known correction method using the above-described color separation LUT. The color mapping unit 522 then converts the input color signal Lab to a color signal L'a'b' that can be reproduced by the image forming apparatus 5103. Ordinarily, when the input color signal Lab can be reproduced by the image forming apparatus 5103, the output color signal L'a'b' is used as the output color signal. If the input color signal cannot be reproduced by the image forming apparatus 5103, it is converted using a commonly known mapping method.

However, even where the input color signal Lab can be reproduced by the image forming apparatus 5103, high-quality color reproduction can not be achieved if the input color signal is used as the output color signal. Therefore, the present embodiment sets a target color to be described later in accordance with the purpose of the color reproduction, and by converting the color signal based on this target color even in cases in which the input color signal can be reproduced by the image forming apparatus 5103, the present embodiment does achieve high-quality color reproduction. With the present embodiment, as purposes of the color reproduction, two types of color reproduction generally required for color printers are used:

1) a first color reproduction that reproduces an image displayed on a monitor as seen by the eye, and 2) a second color reproduction that reproduces more favorably a recorded image of flesh tones, natural greens and the like.

Specifically, the first color reproduction aims so that color of an image displayed on the display unit 51005 and color of an image obtained by forming the displayed image on a paper are the same visually. Specifically, the second color reproduction aims at providing brighter images than the images provided by the first color reproduction, and rotating each hue of skin colors, blues, greens and the like of an image of the first color reproduction, by a predetermined amount in a predetermined direction within a plane a*, b* in a CIELAB color space.

The color mapping unit 522 typically is embodied as a mapping LUT 524 that is combined with the input apparatus model converter 521. That is, the mapping LUT 524 (actually the color mapping unit 522) pairs and stores a plurality of types of RGB input color signals together with post-color-mapping output color signals L'a'b' corresponding to each of the RGB input color signals. That is, a unique L'a'b' can be obtained for a given RGB input color signal by referencing this mapping LUT 524 by inputting a color reproduction instruction from the operation unit 51004 by user. It should be noted that the L'a'b' color signal for any given RGB input color signal is obtained by a commonly known interpolation method using the mapping LUT 524 described above.

Next, the target colors for the first color reproduction and second color reproduction will be described. The target color is an output color signal L'a'b' obtained by converting specific input color signal Lab according to the purpose of the color reproduction in the color mapping unit 522. Typically, it is a measured color value of a color as which a specific RGB input color signal is to be reproduced.

The color conversion processing will be described where the first color reproduction and the second color reproduction are executed for each of the flesh tones, blues, greens and grays of intermediate brightness using the mapping LUT 524.

<Skin Color>

Figure 11:
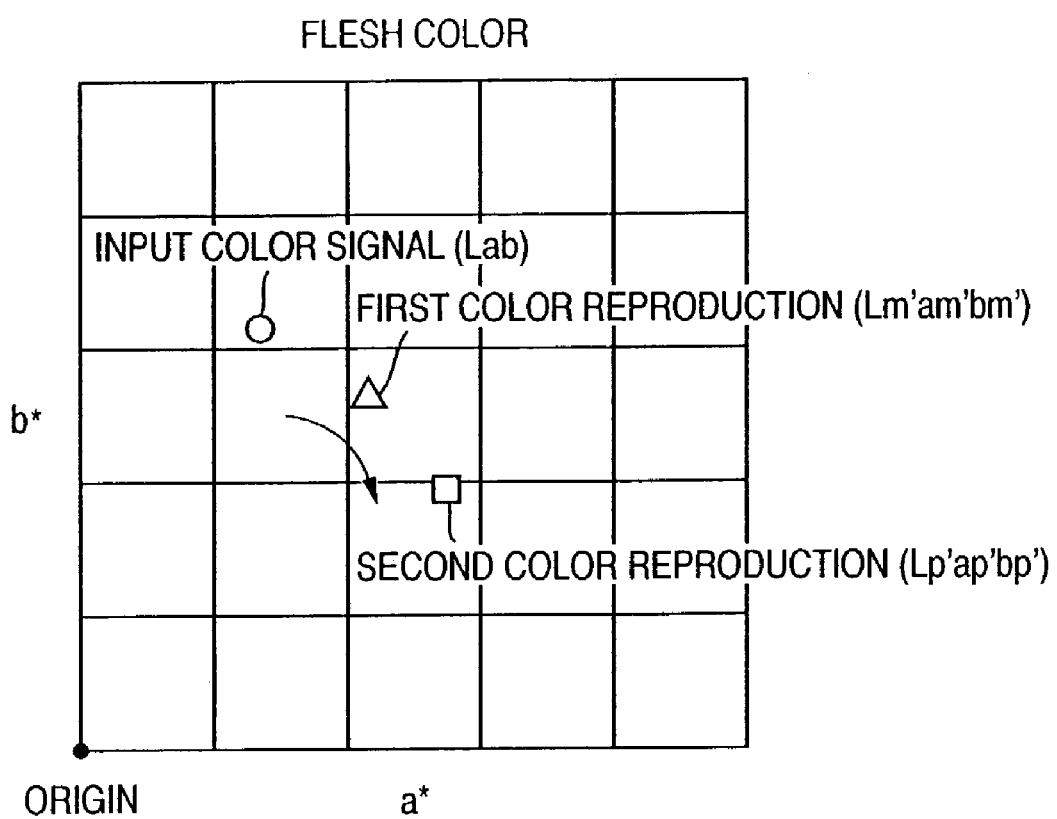
FIG. 11 is a schematic diagram showing conversion of an input color signal Lab corresponding to flesh color in a CIELAB color space.

If the purpose of the color reproduction is the first color reproduction, then an input color signal Lab for a flesh tone is converted into a magenta-accented output color signal Lm' am' bm'. More specifically, the input color signal Lab is converted to a color (Lm' am' bm') indicated by a position in which the position of the input color signal Lab is rotated clockwise around a lower left corner within a plane a*, b* in a CIELAB color space as shown in FIG. 11.

By contrast, if the purpose of the color reproduction is the second color reproduction, then the input color signal Lab is converted to an output color signal Lp' ap' bp' with even more magenta than the output color signal Lm' am' bm' in the case of the first color reproduction purpose described above. More specifically, an input color signal Lab is converted to a color (Lp' ap' bp') indicated by a position rotated even further clockwise around the lower left corner than in the case of the first color reproduction. FIG. 11 shows schematically conversion of an input color signal Lab corresponding to skin color in CIELAB color space.

<Green>

Figure 12:
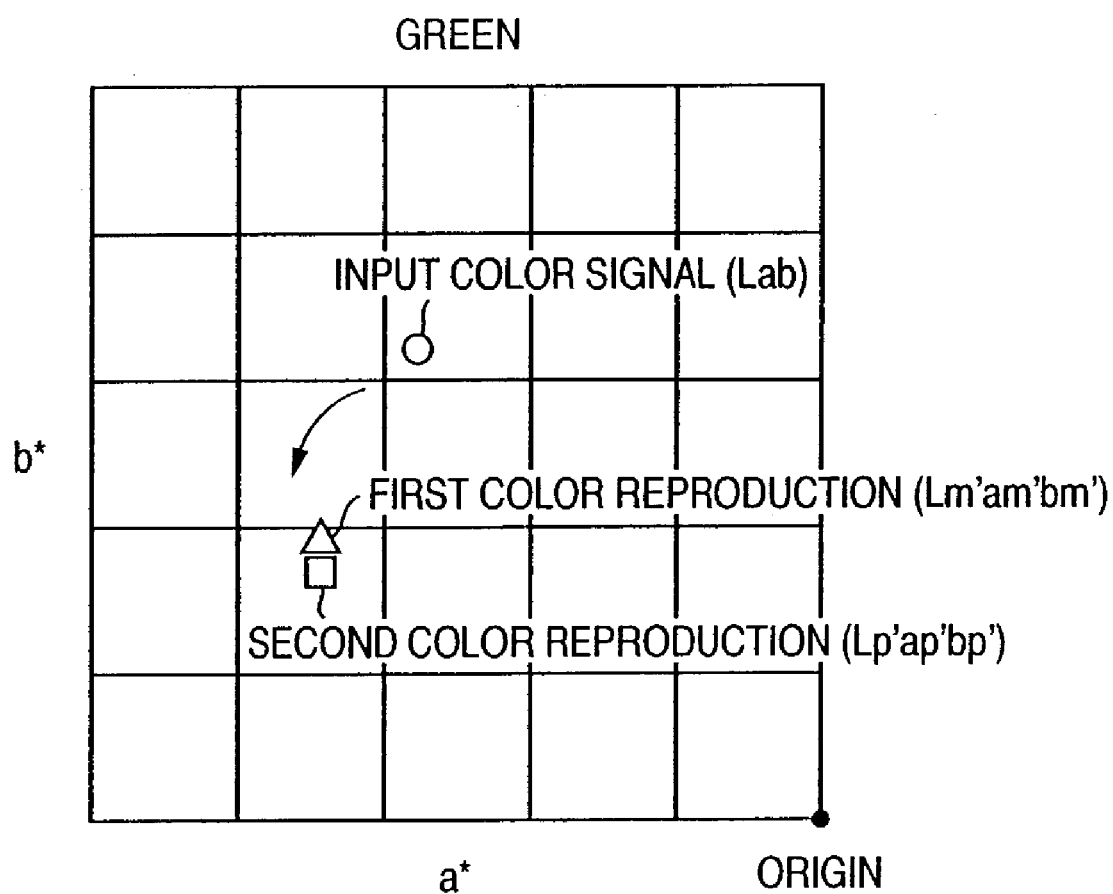
FIG. 12 is a schematic diagram showing conversion of an input color signal Lab corresponding to the color green in a CIELAB color space.

If the purpose of the color reproduction is the first color reproduction, the input color signal Lab corresponding to the color green is converted to a more cyan output color signal Lm' am' bm'. More specifically, the input color signal Lab is converted to a color (Lm' am' bm') indicated by a position in which the position of the input color signal Lab is rotated counter-clockwise around a lower right corner within a plane a*, b* in a CIELAB color space as shown in FIG. 12.

By contrast, if the purpose of the color reproduction is the second color reproduction, then the input color signal Lab is converted to an output color signal Lp' ap' bp' with the same or even more cyan than the output color signal Lm' am' bm' in the case of the first color reproduction described above. More specifically, an input color signal Lab is converted to a color (Lp' ap' bp') indicated by a position rotated even further counter-clockwise around the lower right corner than in the case of the first color reproduction. FIG. 12 shows schematically conversion of an input color signal Lab corresponding to the color green in CIELAB color space.

<Blue>

If the purpose of the color reproduction is the first color reproduction, an input color signal Lab corresponding to the color blue is converted to a cyan-accented output color signal Lm' am' bm'. More specifically, the input color signal Lab is converted to a color (Lm' am' bm') indicated by a position in which the position of the input color signal Lab is rotated clockwise around an upper left corner within a plane a*, b* in the CIELAB color space shown in FIG. 13.

Figure 13:
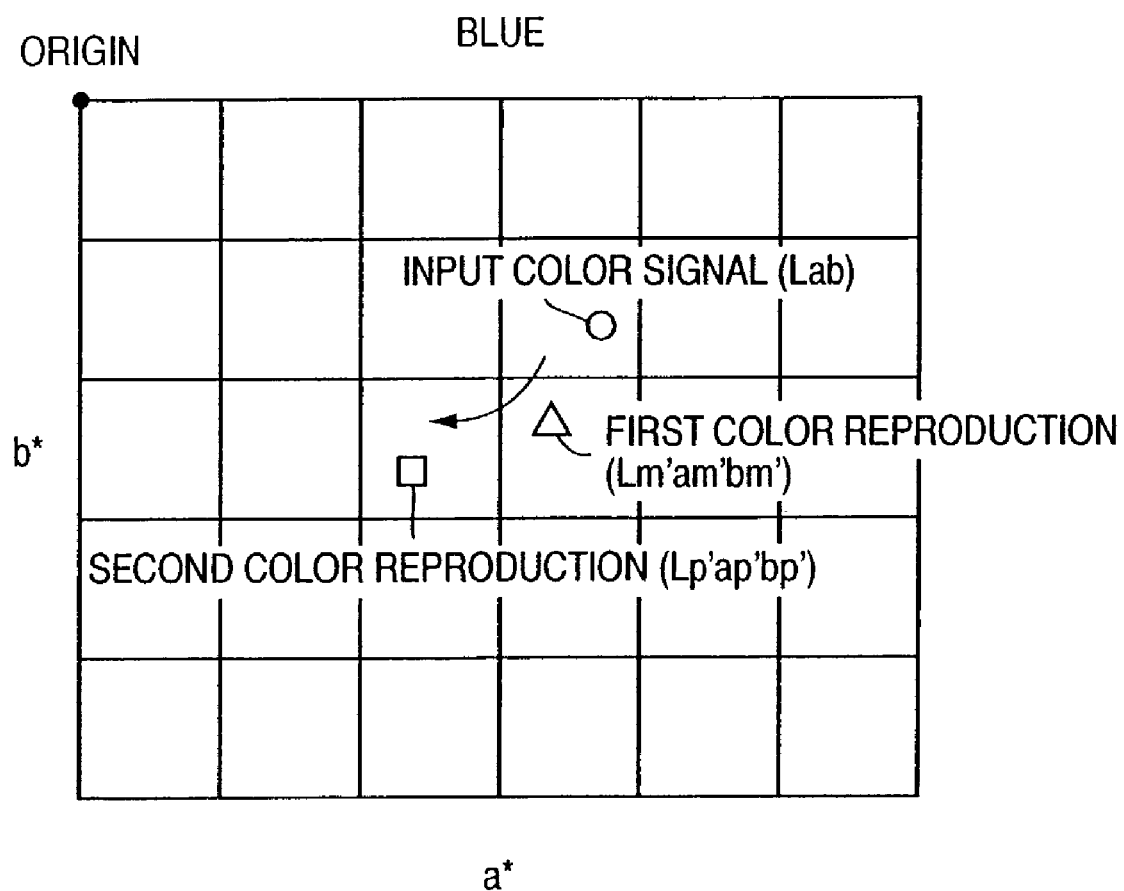
FIG. 13 is a schematic diagram showing conversion of an input color signal Lab corresponding to the color blue in a CIELAB color space.

By contrast, if the purpose of the color reproduction is the second color reproduction, then the input color signal Lab is converted to an output color signal Lp' ap' bp' with even more magenta than the output color signal Lm' am' bm' in the case of the first color reproduction described above. More specifically, an input color signal Lab is converted to a color (Lp' ap' bp') indicated by a position rotated even further clockwise around the upper left corner than in the case of the first color reproduction. FIG. 13 shows schematically conversion of an input color signal Lab corresponding to the color blue in CIELAB color space.

Figure 15:
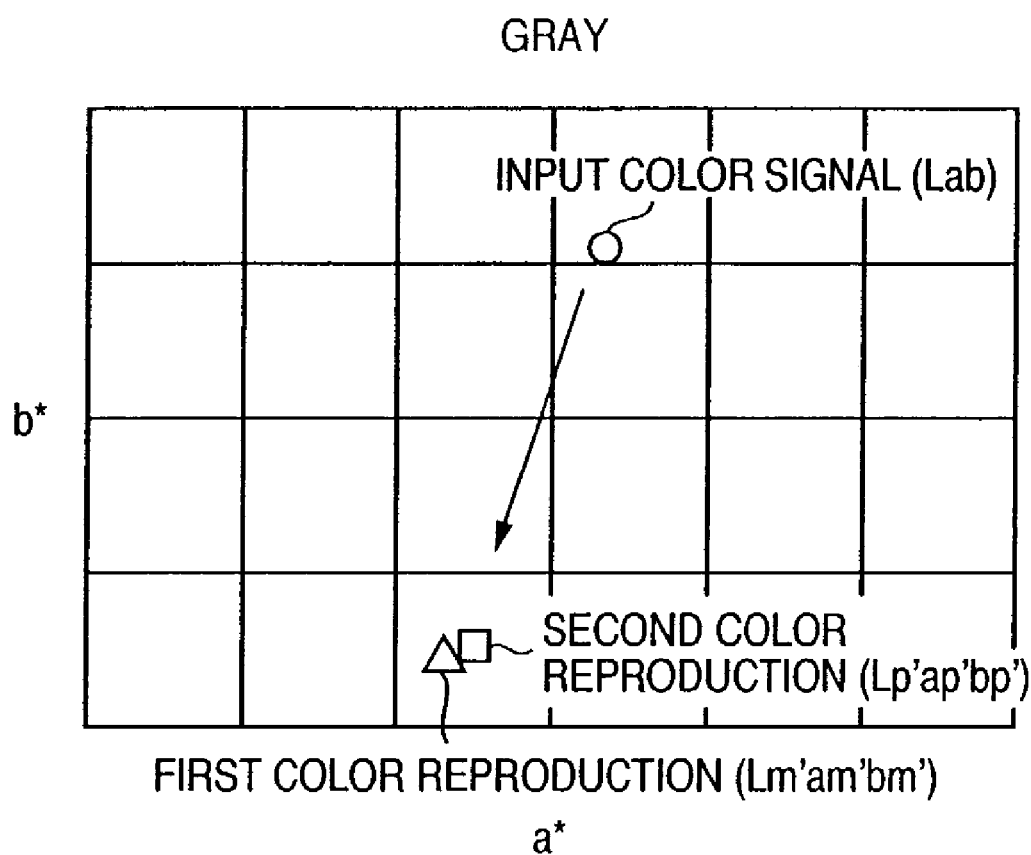
FIG. 15 is a schematic diagram showing conversion of an input color signal Lab corresponding to a gray of intermediate intensity, that is, an achromatic color, in a CIELAB color space.

An input color signal Lab corresponding to a gray of intermediate intensity, that is, an achromatic color, is converted to more blue output color signals Lm' am' bm' and Lp' ap' bp' in the case of the first and second color reproductions respectively. More specifically, the input color signal Lab is converted to a color (Lm' am' bm') indicated by a position in which the position of the input color signal Lab is moved in a direction parallel to the b* axis in the negative direction within a plane a*, b* in a CIELAB color space as shown in FIG. 15. FIG. 15 shows schematically the conversion of an input color signal Lab corresponding to a gray of intermediate intensity, that is, an achromatic color, within a CIELAB color space.

It should be noted that determination of the flesh, blue, green and intermediate intensity gray colors, for example, it may be executed by referring inputted RGB data by the input apparatus model converter 521, or by referring Lab data by the color mapping unit 522.

Figure 14:
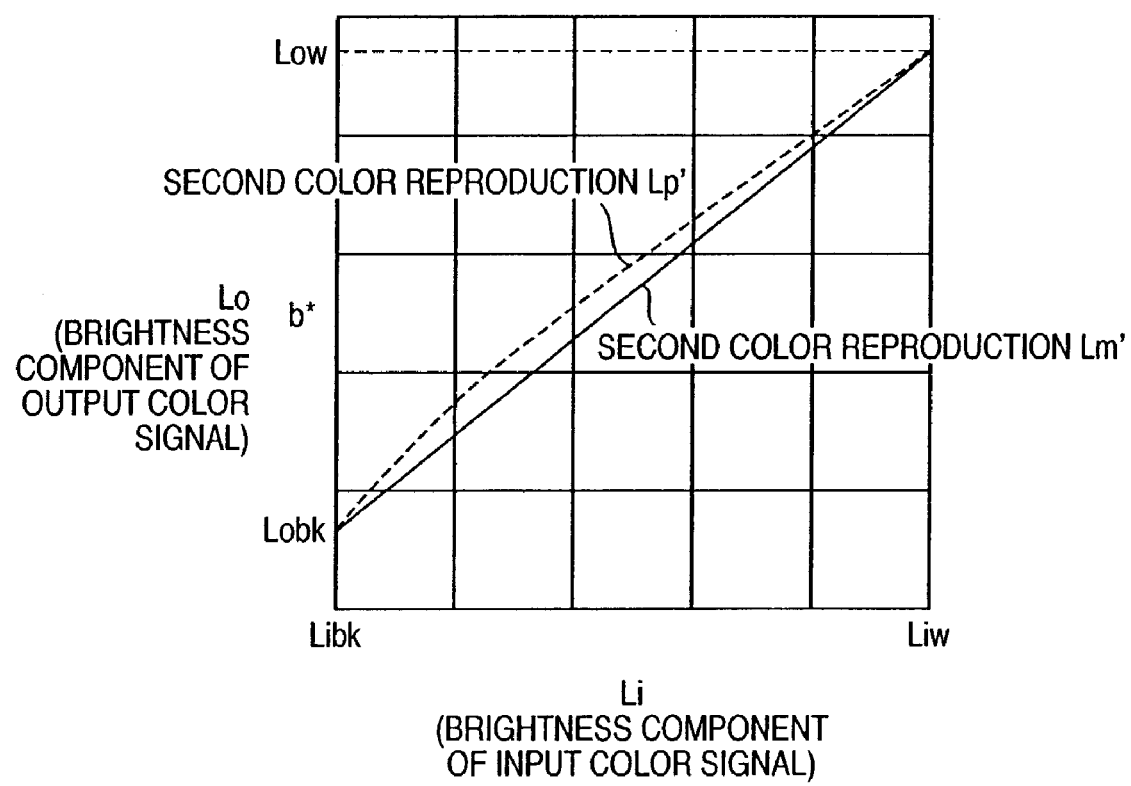
FIG. 14 is a schematic diagram showing the relation between a brightness component performed by a second color reproduction and a brightness component performed by a first color reproduction.

It should be noted that also that conversion of the colors described above also changes the brightness of the overall image. FIG. 14 shows that change of brightness component in case of executing color conversion processing using the mapping LUT 524.

As FIG. 14, the horizontal axis denotes the brightness component L of the image before color conversion and the vertical axis denotes the brightness component L' of the image after color conversion. The curve indicated by the solid line denotes a brightness component Lm' by the first color reproduction and the curve indicated by the dotted line denotes a brightness component Lp' by the second color reproduction. The equations for these curves, that is, the formulaic relation between the component L and the component L' is given as:

$$Lo = Li \times (Low - Lobk)/(Liw - Libk) + Lobk$$

Here, Li denotes the brightness component of the input color signal Lab, Lo denotes the brightness component of the output color signal (Lm' in the case of the first color reproduction, Lp' in the case of the second color reproduction), Liw and Low denote maximum values for L that can be input and output, respectively, and Libk and Lobk denote the minimum values for L that can be input and output. In addition, in the case of the second color reproduction, the input color signal is converted to an output color signal having a brightness Lp' that is greater than the brightness Lm' of the output color signal output in the case of the first color reproduction. That is, the image achieved with the second color reproduction is brighter than the image achieved with the first color reproduction.

Figure 16:
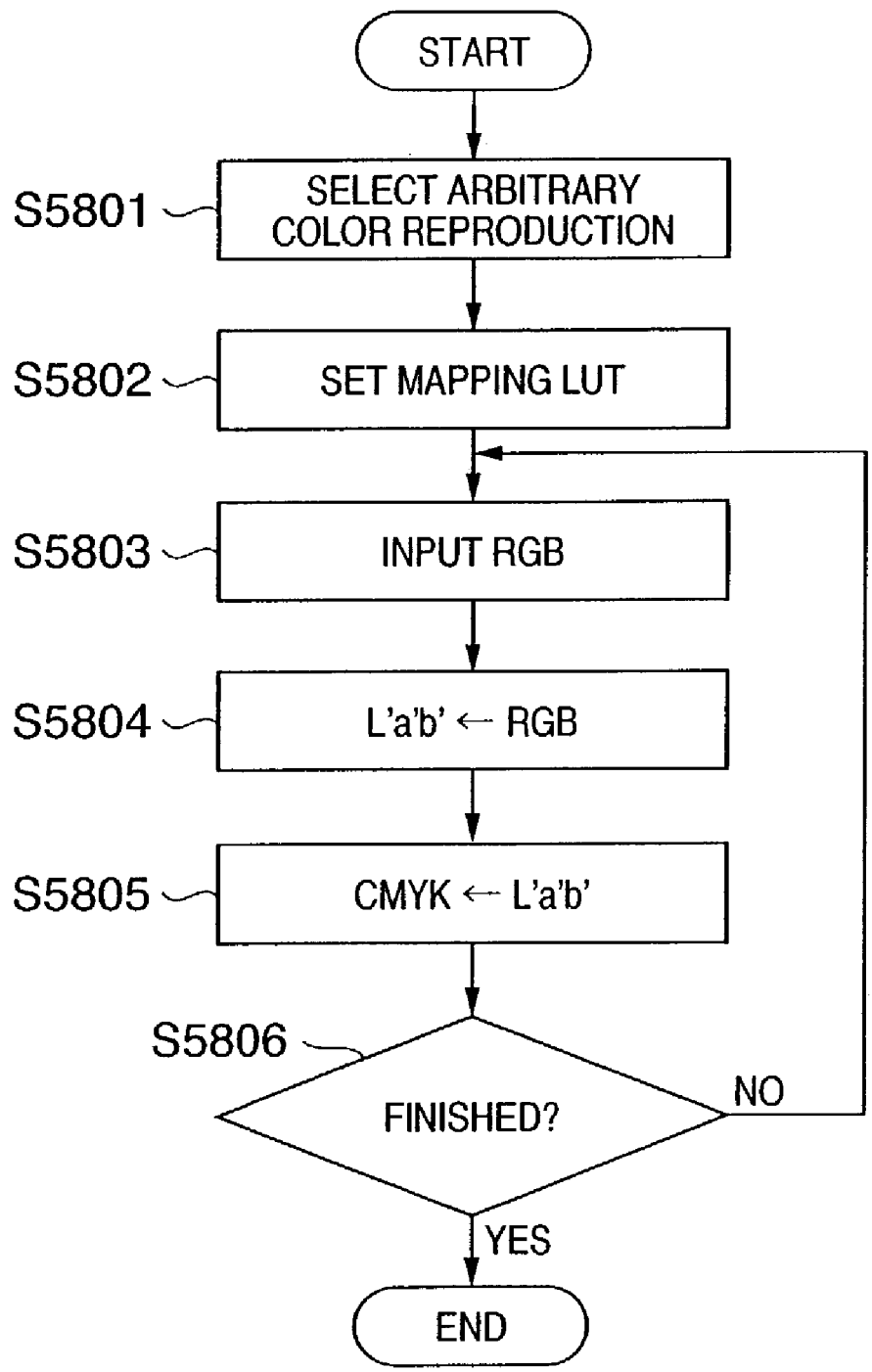
FIG. 16 is a flow chart showing steps performed by the image processing apparatus of the second embodiment of the present invention.

FIG. 16 is a flow chart of the color conversion processing performed by the image processing apparatus of the second embodiment of the present invention. As shown in the diagram, first, a user using the operation unit 51004 selects arbitrary color reproduction between the first color reproduction and the second color reproduction described above (step S5801).

Next, the color mapping unit 522 sets a mapping LUT corresponding to the purpose of color reproduction to be performed (step S5802). Then, when the input apparatus model converter 521 receives RGB data from either the image input apparatus 5101 or the image recording medium 5102 via the image input unit 5110 (step S5803), the input apparatus model converter 521 converts the RGB data to Lab data, and further, the color mapping unit 522 performs the color conversion processing described above for the colors described above corresponding to the Lab data to produce and output L'a'b' data (step S5804).

Thereafter, using the L'a'b' data, the image forming apparatus model converter 523 generates CMYK data corresponding to the image forming apparatus 5103 and outputs the CMYK data to the image output unit 5130 (step S5805). If the data input to the image input unit 5110 is determined to be final data, the process ends.

Figure 17:
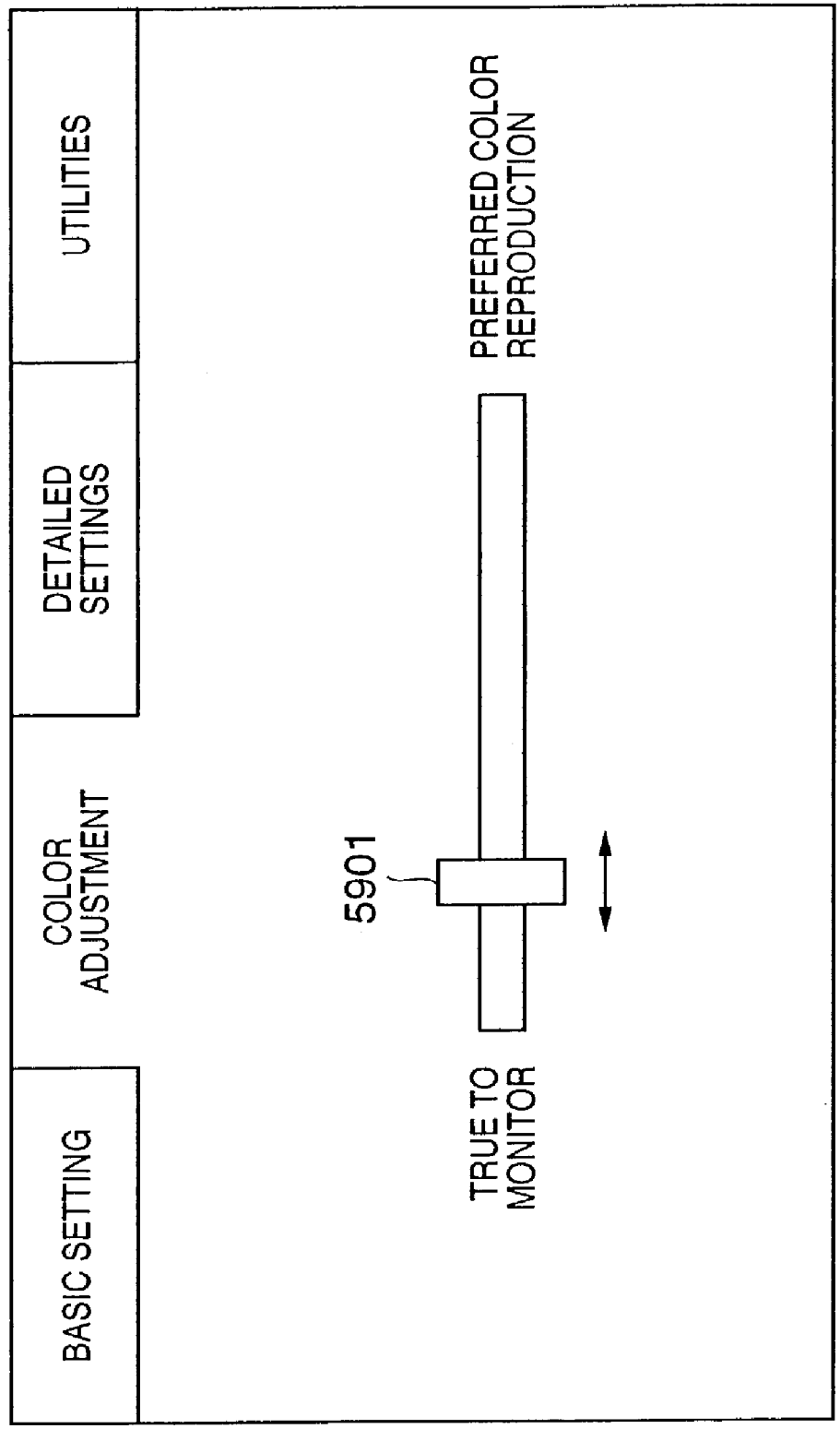
FIG. 17 shows an example of a GUI displayed by display unit 51005, used for the purpose of selecting a given color reproduction of a step S5801.

FIG. 17 shows an example of a GUI displayed by display unit 51005, used for the purpose of selecting a arbitrary color reproduction of a step S5801. By using the operation unit 51004 to operate the GUI, the user can select a desired type of color reproduction.

The GUI in FIG. 17 is equipped with a "color adjustment" page, and in this page the user uses can select arbitrary position or discrete position between the first color reproduction ("monitor-matching color reproduction") and the second color reproduction ("preferred color reproduction") by moving a slide bar 5901 laterally left and right using the operation unit 51004. Reproduction of flesh tones, greens, blues, brightness and grays can be adjusted according to the selected slide position. In this case, the mapping LUT may be calculated using the LUT corresponding to the first color reproduction and the LUT corresponding to the second color reproduction by commonly known method. When selecting discrete position using the slide bar, LUT corresponding to each discrete positions may be prepared in advance.

As described above, the image processing apparatus and image processing method of the present embodiment can realize arbitrary color reproduction between the first color reproduction, that reproduces an image displayed on a monitor as seen by the eye, and the second color reproduction, that reproduces more favorably a recorded image of flesh tones, natural greens of plants and the like, as two color reproduction generally required for a color printer. As a result, a color printer user merely select the purpose of the color reproduction to obtain a desired output image, making it possible to reduce needs of color adjustment based on knowledge and experience.

Other Embodiments

It goes without saying that the object of the present invention is also attained by supplying a storage medium that records program codes of software which implements the functions of the aforementioned embodiments to a system or apparatus and allowing a computer (or CPU or MPU) of the system or apparatus to read and execute the program codes stored in the storage medium. In this case, the program codes read from the storage medium themselves implement the functions of the aforementioned embodiments and the storage medium that stores the program codes constitutes the present invention. Furthermore, it goes without saying that the present invention also includes the case where not only the functions of the aforementioned embodiments are implemented by executing the program codes read by the computer but also the OS (operating system) operating on the computer performs part or whole of actual processing based on instructions of those program codes and implements the functions of the aforementioned embodiments through the processing.

Furthermore, it goes without saying that the present invention also includes the case where the program codes read from the storage medium are written into memory provided for a function expansion board inserted in the computer or a function expansion unit connected to the computer, and then the CPU, etc. provided for the function expansion board or function expansion unit performs part or whole of the actual processing based on instructions of those program codes and implements the functions of the aforementioned embodiments through the processing.

As described above, according to the present invention, it can be provided color conversion that takes regional characteristic and user preferences into consideration.

The present invention is not limited to the above-described embodiments, and various changes and modifications can be made within the spirit and scope of the present invention. Therefore, in order to apprise the public of the scope of the present invention, the following claims are made.

What is claimed is:

1. An image processing apparatus comprising:
a first storage unit adapted to store a plurality of input color profiles;
a second storage unit adapted to store output color profile groups, each of the output color profile groups being prepared for a corresponding output device, and each single output color profile group including output color profiles each of which is prepared for a corresponding area;
a first acquisition unit adapted to acquire an input color profile from said first storage unit;
a designation unit adapted to designate a plurality of areas, an output device, and composition ratios;
a second acquisition unit adapted to specify a output color profile group that is stored in said second storage unit, corresponding to the designated output device, and to acquire output color profiles corresponding to the designated areas from the specified output color profile group;
a composition unit adapted to generate a composed output color profile by composing output color profiles acquired by said second acquisition unit according to the designated composition ratios; and
a conversion unit adapted to color-convert an image based on the input color profile acquired by said first acquisition unit and the composed output color profile,
wherein an output color profile corresponding to an area of interest defines a color conversion which can realize color preference specific to the area of interest,
wherein said first and second storage units are external units of an image processing unit comprising said first and second acquisition units, said composition unit, and said conversion unit, wherein said designation unit displays a user interface so that as a user designates a point within a triangle or a point on an edge of the triangle, each apex of the triangle is associated with a corresponding area, wherein if the user designates a point on the edge, said designation unit designates areas corresponding to two end points A and B of the designated edge, and calculate composition ratio rA=1−Dist/Len of the end point A and composition ratio rB=Dist/Len of the end point B, where Len denotes distance between the two end points A and B, and Dist denotes distance between the designated point and the end point A, said second acquisition unit acquires output color profiles A and B corresponding to the designated areas from the specified output color profile group, and said composition unit generates the composed output color profile as a calculation result of (the output color profile A*rA+the output color profile B*rB), wherein if the user designates a point within the triangle, said designation unit designates areas corresponding to apexes A, B, and C of the triangle, and calculate composition ratio rA=1−2a/(a+b+c) of the apex A, composition ratio rB=1−2b/(a+b+c) of the apex B, and composition ratio rC=1−2c/(a+b+c) of the apex C, where a denotes distance between the designated point and the apex A, b denotes distance between the designated point and the apex B, and c denotes distance between the designated point and the apex C, said second acquisition unit acquires output color profiles A, B, and C corresponding to the designated areas from the specified output color profile group, and said composition unit generates the composed output color profile as a calculation result of (the output color profile A*rA+the output color profile B*rB+the output color profile C*rC).

2. An image processing apparatus comprising:

a storage unit adapted to storage a plurality of color profiles, each of which is prepared for corresponding area;

an acquisition unit adapted to acquire color profiles of two or more areas from said storage unit and calculate composition ratios for the acquired color profiles, according to an instruction from a user;

a composition unit to compose the acquire color profiles according to the calculated ratios, to obtain a composed color profile; and a conversion unit adapted to color-convert an image based on the composed color profile, wherein an color profile corresponding to an area of interest defines a color conversion which can realize color preference specific to the area of interest, wherein said acquisition unit displays a user interface so that as a user designates a point within a triangle or a point on an edge of the triangle, each apex of the triangle being associated with a corresponding area, wherein if the user designates a point on the edge, said designation unit designates areas corresponding to two end points A and B of the designated edge, and calculates composition ratio rA=1−Dist/Len of the end point A and composition ratio rB=Dist/Len of the end point B, where Len denotes distance between the two end points A and B, and Dist denotes distance between the designated point and the end point A, said acquisition unit acquires color profiles A and B corresponding to the designated areas from the color profiles, and said composition unit generates the composed color profile as a calculation result of (the color profile A*rA+the color profile B*rB), wherein if the user designates a point within the triangle, said designation unit designates areas corresponding to apexes A, B, and C of the triangle, and calculates composition ratio rA=1−2a/(a+b+c) of the apex A, composition ratio rB=1−2b/(a+b+c) of the apex B, and composition ratio rC=1−2c/(a+b+c) of the apex C where a denotes distance between the designated point and the apex A, b denotes distance between the designated point and the apex B, and c denotes distance between the designated point and the apex C, said acquisition unit acquires color profiles A, B, and C corresponding to the designated areas from the color profiles, and said composition unit generates the composed color profile as a calculation result of (the output color profile A*rA+the output color profile B*rB+the output color profile C*rC).

3. An image processing method comprising:

a first storage step of storing a plurality of input color profiles in a first storage unit;

a second storage step of storing in a second storage unit output color profile groups, each of the output color profile groups being prepared for corresponding output device, where each single output color profile group includes output color profiles each of which is prepared for a corresponding area;

a first acquisition step of acquiring an input color profile from the first storage unit;

a designation step of designating a plurality of areas, an output device, and composition ratios;

a second acquisition step of specifying a output color profile group, which is stored in the second storage unit, corresponding to the designated output device, and acquiring output color profiles corresponding to the designated areas from the specified output color profile group;

a composition step of generating a composed output color profile by composing output color profiles acquired in said second acquisition step according to the designated composition ratios; and a conversion step of color-converting an image based on the input color profile acquired in said first acquisition step and the composed output color profile, wherein an output color profile corresponding to an area of interest defines a color conversion which can realize color preference specific to the area of interest, wherein the first and second storage units are external units of an image processing unit that performs said first and second acquisition steps, said composition step, and said conversion step, wherein said designation step includes displaying a user interface so that as a user designates a point within a triangle or a point on an edge of the triangle, each apex of the triangle is associated with a corresponding area, wherein if the user designates a point on the edge, said designation step includes designating areas corresponding to two end points A and B of the designated edge, and calculating composition ratio rA=1−Dist/Len of the end point A and composition ratio rB=Dist/Len of the end point B, where Len denotes distance between the two end points A and B, and Dist denotes distance between the designated point and the end point A, said second acquisition step includes acquiring output color profiles A and B corresponding to the designated areas from the specified output color profile group, and said composition step includes generating the composed output color profile as a calculation result of (the output color profile A*rA+the output color profile B*rB), wherein if the user designates a point within the triangle, said designation step includes designating areas corresponding to apexes A, B, and C of the triangle, and calculating composition ratio rA=1−2a/(a+b+c) of the apex A, composition ratio rB=1−2b/(a+b+c) of the apex B, and composition ratio rC=1−2c/(a+b+c) of the apex C, where a denotes distance between the designated point and the apex A, b denotes distance between the designated point and the apex B, and c denotes distance between the designated point and the apex C said second acquisition step includes acquiring output color profiles A, B, and C corresponding to the designated areas from the specified output color profile group, and said composition step includes generating the composed output color profile as a calculation result of (the output color profile A*rA+the output color profile B*rB+the output color profile C*rC).

4. An image processing method comprising:

a storage step of storing in a storage unit a plurality of color profiles, each of which is prepared for a corresponding area;

an acquisition step of acquiring color profiles of two or more areas from the storage unit and calculating composition ratios for the acquired color profiles, according to an instruction from a user;

a composition step of composing the acquire color profiles according to the calculated ratios, to obtain a composed color profile; and a conversion step of color-converting an image based on the composed color profile, wherein an color profile corresponding to an area of interest defines a color conversion which can realize a color preference specific to the area of interest, wherein said acquisition step includes displaying a user interface so that as a user designates a point within a triangle or a point on an edge of the triangle, each apex of the triangle is associated with a corresponding area, wherein if the user designates a point on the edge, said designation step includes designating areas corresponding to two end points A and B of the designated edge, and calculating composition ratio rA=1−Dist/Len of the end point A and composition ratio rB=Dist/Len of the end point B, where Len denotes distance between the two end points A and B, and Dist denotes distance between the designated point and the end point A, said acquisition step includes acquiring color profiles A and B corresponding to the designated areas from the color profiles, and said composition step includes generating the composed color profile as a calculation result of (the color profile A*rA+the color profile B*rB), wherein if the user designates a point within the triangle, said designation step includes designating areas corresponding to apexes A, B, and C of the triangle, and calculating composition ratio rA=1−2a/(a+b+c) of the apex A, composition ratio rB=1−2b/(a+b+c) of the apex B, and composition ratio rC=1−2c/(a+b+c) of the apex C, where a denotes distance between the designated point and the apex A, b denotes distance between the designated point and the apex B, and c denotes distance between the designated point and the apex C, said acquisition step includes acquiring color profiles A, B, and C corresponding to the designated areas from the color profiles, and said composition step includes generating the composed color profile as a calculation result of (the output color profile A*rA+the output color profile B*rB+the output color profile C*rC).

5. A storage medium storing a program for causing a computer to execute an image processing method according to claim 4.

* * * * *

UNITED STATES PATENT AND TRADEMARK OFFICE
CERTIFICATE OF CORRECTION

PATENT NO.         : 7,450,281 B2                                     Page 1 of 1
APPLICATION NO.    : 10/420730
DATED              : November 11, 2008
INVENTOR(S)        : Makoto Torigoe et al.

It is certified that error appears in the above-identified patent and that said Letters Patent is hereby corrected as shown below:

<u>COVER PAGE, item [54] and Col. 1, line 5</u>:
Title, "IMAGE PROCESSING APPARATUS AND INFORMATION PROCESSING APPARATUS, AND METHOD THEREOF" should read --IMAGE PROCESSING APPARATUS AND INFORMATION PROCESSING APPARATUS, AND METHOD THEREFOR--.

Signed and Sealed this

Eighth Day of December, 2009

David J. Kappos
*Director of the United States Patent and Trademark Office*